Patented Mar. 16, 1943

2,314,137

UNITED STATES PATENT OFFICE 2,314,137

DIESEL FUEL

Everett W. Fuller and Edwin M. Nygaard, Woodbury, N. J., assignors to Socony-Vacuum Oil Company, Incorporated, New York, N. Y., a corporation of New York No Drawing. Application October 30, 1940, Serial No. 363,493

14 Claims. (Cl. 44—57)

This invention has to do with fuels for compression-ignition or Diesel engines and is more particularly concerned with the modification of such fuels by the addition thereto of a characterizing ingredient for the purpose of modifying or controlling their combustion characteristics.

In engines operating on the Diesel cycle, where the fuel charge is injected into a combustion space, it is important to the attainment of maximum efficiency that the delay period between injection and ignition be short. Enhanced speed of ignition in a Diesel fuel is, therefore, a highly desirable characteristic. Improperly delayed ignition in a Diesel engine gives rise to the phenomena known as "knocking," due to improper coordination of combustion and cylinder conditions. By properly adjusting the ignition delay period of the fuel, through acceleration of the ignition point, it is possible to lower the compression pressure which will insure spontaneous ignition without combustion shock, thereby increasing the ease of starting and the smoothness with which combustion takes place. The low compression pressure permits a lower weight in the engine and a lower cost per unit power output.

It has been found that the ignition quality of a Diesel fuel oil can be improved by the addition of small amounts of various compounds which act as ignition accelerators. Many of the compounds heretofore proposed are unsatisfactory from the standpoint of stability, cost, toxicity or because of their tendency to form corrosive gases in the combustion chamber of the engine.

The present invention is based upon the discovery that the organic hydroxylamines constitute a class of compounds which, when added in minor proportion to a Diesel fuel, are effective to decrease the ignition delay period and thereby improve the ignition quality of the fuel and the consequent operation of the engine in which it is used. It is a collateral object of this invention to provide a method of accelerating the ignition of liquid hydrocarbon fuels in compression ignition engines by admixing a minor proportion of an organic hydroxylamine with the fuel prior to its injection into the cylinder of the engine.

The organic hydroxylamines which, from the standpoint of stability and ease of synthesis, are preferred for the purpose of this invention are encompassed by the general formula

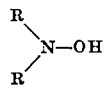

wherein R is selected from the group consisting of alkyl, cycloalkyl and aralkyl radicals. More specifically, the present invention contemplates as the preferred group of compounds, the alkyl hydroxylamines, the cycloalkyl hydroxylamines, and the aralkyl hydroxylamines. These compounds may be prepared by the oxidation of secondary amines with 3% or stronger hydrogen peroxide in an aqueous or alcoholic medium. (J. Chem. Soc. 75 1004 (1899) Dunsten and Goulding). They may also be prepared from organic compounds containing an active halogen atom (such as benzyl chloride) by the direct alkylation of hydroxylamine (Ber. 19 1926 (1886) F. Walder; Ann 257 216 (1890) Behrend and Leuchs).

Further details in procedures which may be followed in synthesizing the compounds contemplated herein can be obtained from the following examples describing the preparation of typical organic hydroxylamines which have been employed to demonstrate the effectiveness of this class of compounds as improvers for Diesel fuels.

EXAMPLE ONE

PREPARATION OF DI-N-BUTYL HYDROXYLAMINE
($C_4H_9$)$_2$NOH

One part of dibutyl amine was transferred to a liter three-necked flask equipped with a stirrer, thermometer and dropping funnel. Approximately 1.8 parts of 95% ethyl alcohol were added. Aqueous hydrogen peroxide (3.26% $H_2O_2$ by weight) and ethyl alcohol were alternately added to keep a clear solution. A total 8.3 parts of aqueous hydrogen peroxide and 7.4 parts of 95% ethyl alcohol were added. The mixture was stirred constantly during the additions. The reaction mixture was allowed to stand for about four days at room temperature. The product was poured into about twice its volume of water and extracted several times with diethyl ether. The ether extract was dried over anhydrous sodium sulfate, filtered and the ether removed by evaporation at reduced pressure. The residue was vacuum distilled. The final product distilled at a temperature of approximately 70° C. at a pressure of 12 mm. and had a melting point of 48–50° C.

EXAMPLE TWO

PREPARATION OF DIBENZYL HYDROXYLAMINE
($C_6H_5CH_2$)$_2$NOH

One part of hydroxylamine hydrochloride, 3.6 parts of benzyl chloride, 4.3 parts of sodium carbonate and 14.3 parts of 90% ethyl alcohol were transferred to a one liter Erlenmeyer flask equipped with a reflux condenser and heated for about one and a third hours over a boiling water bath. The hot solution was filtered. The product separated as colorless needles from the filtrate. It was purified by washing in turn with 90% ethyl alcohol and distilled water. The dried product melted at 119–120.5° C.

EXAMPLE THREE

DICYCLOHEXYL HYDROXYLAMINE
$(C_6H_{11})_2NOH$

This product was obtained as a solid by the oxidation of an alcohol solution of dicyclohexyl amine with a 3% aqueous hydrogen peroxide solution. It had a melting point of 88–89° C.

The effectiveness of the class of compounds contemplated herein as ignition accelerators for Diesel fuels was demonstrated by preparing blends of typical Diesel fuels (hereinafter designated as "Fuel A" and "Fuel B") and the typical compounds obtained by the procedures described above. The improvement in ignition quality of these blends was ascertained by determination of their cetane numbers, such determinations being made by the method proposed in A. S. T. M. Proc. 38 I 392 (1938). The specifications of Fuel A and Fuel B together with the cetane number determinations on the fuel blends are tabulated below.

Fuel A was a straight run number two fuel oil possessing the following characteristics:

| | |
|---|---|
| Gravity, ° A. P. I | 39.8 |
| Flash point (Pensky-Martens, ° F) | 172 |
| Aniline point, ° F | 160.5 |
| A. S. T. M. distillation: | |
| Initial ° F | 386 |
| 10% | 435 |
| 90% | 572 |
| End point | 614 |
| Diesel index | 63.9 |
| Cetane number | 56.0 (for #1 and #3 below) |
| Cetane number | 55.1[1] (for #2 below) |

*Cetane number determinations on blends*

| Substance blended with fuel A | Per cent by weight added | Cetane number of blend | Increase in cetane number |
|---|---|---|---|
| 1. Di-n-butyl-hydroxylamine | 0.5 | 60.0 | 4.0 |
| 2. Dibenzyl hydroxylamine | <0.5 | [1] 55.4 | 0.3 |
| 3. Dicyclohexyl hydroxylamine | 0.5 | 61.0 | 5.0 |

[1] New reference fuels were used to determine the cetane number.

Fuel B was a catalytically cracked fuel oil prepared from Mirando gas oil and possesses the following characteristics:

| | |
|---|---|
| Gravity, ° A. P. I | 26.8 |
| Flash point (Pensky-Martens, ° F.) | 176 |
| Aniline point, ° F | 101.2 |
| A. S. T. M. distillation: | |
| Initial ° F | 388 |
| 10% | 433 |
| 90% | 555 |
| End point | 630 |
| Diesel index | 27.1 |
| Cetane number | 21.7 |

*Cetane number determination on blend*

| Substance blended with fuel B | Per cent by weight added | Cetane number of blend | Increase in cetane number |
|---|---|---|---|
| Dicyclohexyl hydroxylamine | 1.0 | 24.3 | 2.6 |

It will be seen from the foregoing data that the organic hydroxylamines, of which the compounds listed are representative, are effective to substantially improve the ignition quality of Diesel fuel when admixed therewith in minor proportions. The amount of compound used may be varied depending upon the character of the base stock and the extent of the improvement desired. In general it appears that amounts ranging from about 0.1% to about 5.0% will effect the desired improvement.

It is to be understood that the term "Diesel fuel" as used herein has reference to any hydrocarbon fuel adapted for use in an engine operating according to the Diesel cycle.

We claim:

1. An improved Diesel fuel having in admixture therewith from about 0.1 per cent to about 5 per cent of an organic hydroxylamine, consisting only of carbon, hydrogen, oxygen and nitrogen, in an amount sufficient to improve the ignition quality of the fuel.

2. An improved Diesel fuel having in admixture therewith from about 0.1 per cent to about 5 per cent of an alkyl hydroxylamine in an amount sufficient to improve the ignition quality of the fuel.

3. An improved Diesel fuel having in admixture therewith from about 0.1 per cent to about 5 per cent of a cycloalkyl hydroxylamine in an amount sufficient to improve the ignition quality of the fuel.

4. An improved Diesel fuel having in admixture therewith from about 0.1 per cent to about 5 per cent of an aralkyl hydroxylamine in an amount sufficient to improve the ignition quality of the fuel.

5. An improved Diesel fuel having in admixture therewith from about 0.1 per cent to about 5 per cent of di-n-butyl hydroxylamine in an amount sufficient to improve the ignition quality of the fuel.

6. An improved Diesel fuel having in admixture therewith from about 0.1 per cent to about 5 per cent of dicyclohexyl hydroxylamine in an amount sufficient to improve the ignition quality of the fuel.

7. An improved Diesel fuel having in admixture therewith from about 0.1 per cent to about 5 per cent of dibenzyl hydroxylamine in an amount sufficient to improve the ignition quality of the fuel.

8. The method of accelerating the ignition of a liquid hydrocarbon fuel in an engine where the fuel is injected into the compressed air in the engine cylinder and ignites spontaneously therein, which comprises admixing with the fuel, prior to its injection into the cylinder, consisting only of carbon, hydrogen, oxygen and nitrogen, an organic hydroxylamine in an amount in excess of 0.1 per cent.

9. The method of accelerating the ignition of a liquid hydrocarbon fuel in an engine where the fuel is injected into the compressed air in the engine cylinder and ignites spontaneously therein, which comprises admixing with the fuel, prior to its injection into the cylinder, an alkyl hydroxylamine in an amount in excess of 0.1 per cent.

10. The method of accelerating the ignition of a liquid hydrocarbon fuel in an engine where the fuel is injected into the compressed air in the engine cylinder and ignites spontaneously therein, which comprises admixing with the fuel, prior to its injection into the cylinder, a cycloalkyl hydroxylamine in an amount in excess of 0.1 per cent.

11. The method of accelerating the ignition of a liquid hydrocarbon fuel in an engine where the fuel is injected into the compressed air in the engine cylinder and ignites spontaneously therein, which comprises admixing with the fuel, prior to its injection into the cylinder, an aralkyl hydroxylamine in an amount in excess of 0.1 per cent.

12. The method of accelerating the ignition of a liquid hydrocarbon fuel in an engine where the fuel is injected into the compressed air in the engine cylinder and ignites spontaneously therein, which comprises admixing with the fuel, prior to its injection into the cylinder, di-n-butyl hydroxylamine in an amount in excess of 0.1 per cent.

13. The method of accelerating the ignition of a liquid hydrocarbon fuel in an engine where the fuel is injected into the compressed air in the engine cylinder and ignites spontaneously therein, which comprises admixing with the fuel, prior to its injection into the cylinder, dicyclohexyl hydroxylamine in an amount in excess of 0.1 per cent.

14. The method of accelerating the ignition of a liquid hydrocarbon fuel in an engine where the fuel is injected into the compressed air in the engine cylinder and ignites spontaneously therein, which comprises admixing with the fuel, prior to its injection into the cylinder, dibenzyl hydroxylamine in an amount in excess of 0.1 per cent.

EVERETT W. FULLER.
EDWIN M. NYGAARD.